J. C. MYERS.
OPERATING HANDLE FOR BRAKE WHEELS.
APPLICATION FILED JAN. 19, 1918.

1,276,680.

Patented Aug. 20, 1918.

Inventor
Joseph C. Myers.

Witnesses

By Victor J. Evans.
Attorney

UNITED STATES PATENT OFFICE.

JOSEPH C. MYERS, OF WEST ALBANY, NEW YORK.

OPERATING-HANDLE FOR BRAKE-WHEELS.

1,276,680.　　　　Specification of Letters Patent.　　Patented Aug. 20, 1918.

Application filed January 19, 1918. Serial No. 212,743.

*To all whom it may concern:*

Be it known that I, JOSEPH C. MYERS, a citizen of the United States, residing at West Albany, in the county of Albany and State of New York, have invented new and useful Improvements in Operating-Handles for Brake-Wheels, of which the following is a specification.

This invention relates to brake wrenches and has for its principal object, the provision of a device of this character which may be readily applied to or quickly removed from a brake wheel or the like and which will include a portion extending radially of the axis of the wheel and beyond the periphery of the latter in order that a maximum leverage can be applied thereto when turning the wheel.

Another object of the invention resides in the construction of a device of this character which will be strong and durable, simple and inexpensive to manufacture; one which may be conveniently carried in the pocket of the user and one which will be adjustable to wheels of varying sizes.

With the above and other objects in view which will appear as the nature of the invention is better understood, the same consists in the improved construction and novel arrangements of parts which will hereinafter be fully described and particularly pointed out in the claims.

In the accompanying drawing, has been illustrated, a single and preferred form of the invention, it being, however, understood that no limitations are necessarily made to the precise structural details therein exhibited, but that changes, alterations and modifications within the scope of the claims may be resorted to when desired.

Figure 3:
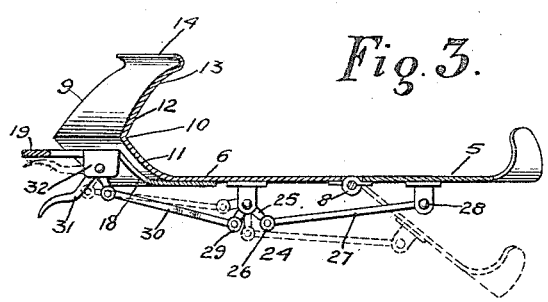
Fig. 3, is a longitudinal section therethrough.

The invention is intended primarily for use in connection with the manipulating wheels of car brakes or other devices in which it is desired to apply maximum power to an object which is intended to be moved on operation of the wheel. It consists of two mating sections 5 and 6, which are hingedly connected together at 7. A spring 8, is included in the hinge and the same is operatively connected with the two sections 5 and 6, of the device whereby the same can be actively held in an applied position upon the wheel to be turned. The section 6, is provided with a rim engaging lug or flange 9, provided with a channel 10, having inner angularly disposed surfaces 11 and 12, and an inner curved surface 13, the latter merging into the surface 12, as shown in Fig. 3. The outer extremity of the lug is coiled at 14, in order to facilitate its passing into position upon the wheel.

Figure 1:
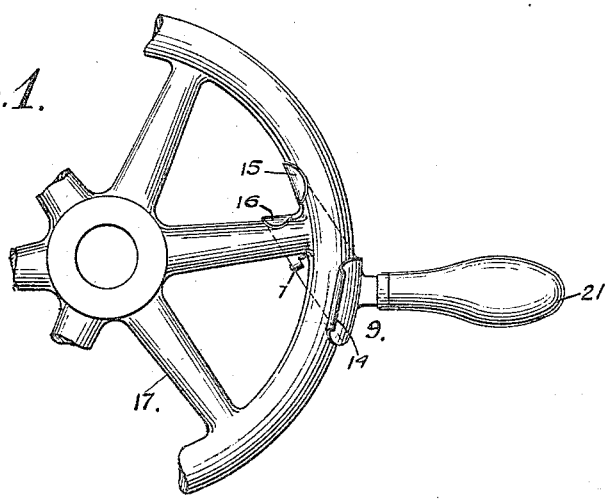
Figure 1, is a plan view of a portion of a brake wheel showing the application of the invention thereto.
Figure 2:
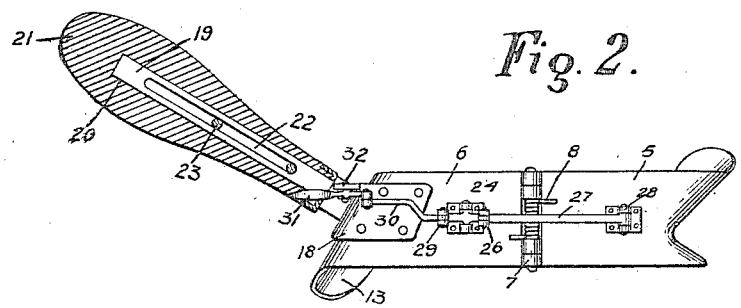
Fig. 2, is a plan view thereof, showing the lever in section.

The section 5, is provided at its free end with lugs 15 and 16, which are respectively extended at different angles as clearly shown in Fig. 1. The lugs 9, 15 and 16, are mutually associated whereby the former will adapt itself to the peripheral formation or rim of a brake wheel such as the one shown at 17 herein while the lugs 15 and 16 are adapted to be fitted in the crotch between one of the spokes and the inner walls of the rim of the wheel. With the parts positioned in this manner, the device becomes positioned to the wheel and leverage may be applied to the device to prevent turning movements of the wheel.

Fixed to the section 6, is a plate 18, having a shank 19, which extends into a correspondingly formed bore 20, of a handle 21. Said shank is provided with a longitudinal slot 22, which accommodates a fixed pin 23, carried by the handle. In this manner, the handle can be adjusted on the shank in order that the requisite leverage against the wheel can be obtained to establish best results. The shank 19, is preferably extended at an angle to the direction of the sections 5 and 6, so that the handle 21, will occupy a substantially radial position with respect to the rim of the brake wheel. In order that the lugged portions 9, 15, and 16, of the sections 5 and 6, may be conveniently applied to or removed from the wheel, use is made of an actuating mechanism 24. This mechanism consists in providing the section 6, with a rocker 25, having one arm 26, connected with a controlling link 27, the latter having one end pivoted at 28, to the section 5. The other arm 29 of said rocker, is connected with a power transmitting link 30 and the same, in turn, is adapted to receive its movement through an actuating handle 31, pivoted upon said section 6, and preferably from a lug 32, stamped from plate 18. By pressing upon the handle 31, in an upward direction, the several instrumentalities assume the dotted line positions shown in Fig. 3, and at such time, the device as a whole, can be conveniently applied to or removed from the wheel as the occasion demands. The handle 31, is preferably positioned immediately adjacent to the handle 21, in order that it may be under the direct control of the hand of the operator at all times.

The application of the device to a brake wheel of the type specified, permits a maximum leverage to be applied to the wheel. The device is simple of construction, strong and durable and designed whereby it may be readily carried in the pocket of its user.

While I have shown one embodiment of the invention, I wish to describe that the basic feature intended to be emphasized, resides in the relative association of lugs 9, 15 and 16, all of which are carried by a support which is adapted to be quickly placed beneath the rim of the wheel so that the lug 9, will engage against the outer periphery thereof, the lug 15, against the inner walls of the rim and the lug 16, against the next adjacent spoke. This gives all necessary rigidity which is desired in maintaining an applied position of the device to the wheel and yet the association of parts as described will permit the device to be applied to or removed from the wheel with the utmost rapidity.

What is claimed as new is:—

1. A wrench for brake wheels, comprising, a body member provided with a lug adapted to be brought in close contact with the periphery of the wheel, a plurality of lugs respectively adapted to be brought in contact with the inner walls of the wheel and the next adjacent spoke thereof respectively, and a handle carried by said body member and adapted to be extended in a radial position to the periphery of the wheel when the device is applied, the lugs serving to hold said body member in a relatively fixed position upon the wheel in order that power can be applied to said handle.

2. A wrench for brake wheels comprising a body member adapted for substantially rigid embracing connection with the rim of the wheel, a handle projecting from said member, and adapted to be adjusted thereon, to change its position with relation to the axis of the wheel.

3. A wrench for brake wheels comprising, a body member having hinged sections adapted to mutally embrace the rim of the wheel, a handle carried by one of said sections and adapted to project radially of the rim of the wheel, and means for swinging one of said sections on the other section.

4. A brake wrench for wheels having annular rims and radial spokes comprising, a member having a lug adapted to engage against the outside face of the rim, a lug adapted to engage with the inside face of the rim and a lug adapted to engage with one of the spokes of the wheel.

5. A brake wrench comprising a plurality of hingedly connected sections, a handle extending from one of said sections, means for maintaining a normal position of said sections, and mechanism for shifting the sections relatively from their normal positions and including an actuating portion arranged adjacent to said handle.

In testimony whereof I affix my signature.

JOSEPH C. MYERS.

Copies of this patent may be obtained for five cents each, by addressing the "Commissioner of Patents, Washington, D. C."